Jan. 3, 1967 D. VON SANDEN ETAL 3,296,377

TIME MULTIPLEX TELEPHONE SYSTEM WITH MULTI-FREQUENCY DIALING

Filed May 24, 1961 5 Sheets-Sheet 1

Jan. 3, 1967 D. VON SANDEN ETAL 3,296,377

TIME MULTIPLEX TELEPHONE SYSTEM WITH MULTI-FREQUENCY DIALING

Filed May 24, 1961 5 Sheets-Sheet 2

INVENTORS

DIETER VON SANDEN, HUBERT SUCKFÜLL,
HANS DÖRFLER, EIBE-SIADE FRERS,
MAX SCHLICHTE, HANS HÖSCHLER,
& EDMUND PTACNIK

BY [signature] ATTORNEYS

TIME MULTIPLEX TELEPHONE SYSTEM WITH MULTI-FREQUENCY DIALING

Filed May 24, 1961 5 Sheets-Sheet 3

READING DEVICE

TIME MULTIPLEX TELEPHONE SYSTEM WITH MULTI-FREQUENCY DIALING

Filed May 24, 1961 5 Sheets-Sheet 4

INVENTORS

DIETER VON SANDEN, HUBERT SUCKFÜLL
HANS DÖRFLER, EIBE-SIADE FRERS,
MAX SCHLICHTE, HANS HÖSCHLER,
& EDMUND PTACNIK

BY Spice & Spice ATTORNEYS

INVENTORS
DIETER VON SANDEN, HUBERT SUCKFÜLL,
HANS DÖRFLER, EIBE-SIADE FRERS,
MAX SCHLICHTE, HANS HÖSCHLER,
& EDMUND PTACNIK
BY Spiee & Spiee ATTORNEYS United States Patent Office 3,296,377
Patented Jan. 3, 1967

3,296,377

TIME MULTIPLEX TELEPHONE SYSTEM WITH MULTI-FREQUENCY DIALING

Dieter Von Sanden, Munich-Solln, Hubert Suckfüll, Munich-Obermenzing, and Hans Dörfler, Eibe Siade Frers, Max Schlichte, Hans Höschler, and Edmund Ptacnik, Munich, Germany, assignors to Siemens & Halske Aktiengesellschaft Berlin and Munich, a corporation of Germany Filed May 24, 1961, Ser. No. 112,307
Claims priority, application Germany, June 10, 1960, S 68,879
13 Claims. (Cl. 179—15)

This invention is concerned with an electronic communication system, for example, a telephone system, operating in accordance with the time multiplex principle. The characteristic feature of such a system resides in modulating communications which are to be exchanged, upon impulse sequences which are mutually displaced or transposed, thereby permitting multiple utilization of connection channels. These impulse or pulse sequences, hereinafter briefly referred to as control pulses, are in some systems individually assigned to subscriber stations while they are in other systems assigned to extended connections. The present invention is solely concerned with systems of the latter type which distinguish basically from other systems by the peculiarity that the control pulses are assigned to extended connections, thus requiring an entirely different organization of connecting devices.

Known systems of the type which is pertinent in connection with the present invention provide for each subscriber a normally open electronic call switch over which the respective subscribers can be interconnected with a so-called call multiplex terminal. The mutually displaced pulse sequences, that is, the phase shifted control pulses, are effective to close only those of the call switches which belong to subscribers who are to be interconnected for communication purposes. Two cyclic storers are provided for operatively controlling the call switches, the addresses of the subscribers engaged respectively in outgoing calls and in incoming calls being separately entered in these storers in coded form. The addresses (symbols or signals assigned individually to the respective subscribers) of interconnected subscribers appear at the outputs of the cyclic storers simultaneously impulsewise and repeatedly. The addresses are accordingly with given pulse phases simultaneously cycled in the respective cyclic storers from which they are extended to devices that may be designated as decoders, the latter being operative to evaluate the addresses for the purpose of causing closure of the call switches assigned to the interconnected subscribers. Connections between communicating subscribers are in this manner maintained.

However, such connections must first be extended and subsequently released again. The storing in the cyclic storers of the addresses of a calling subscriber and of a called subscriber is a requirement preceding the extension of a call. Known communication systems of the type which is being considered here present various solutions for the problems involved.

An exchange system also is known, for example, as illustrated in U.S. Patent 3,061,685, which operates according to the time multiplex principle and in which control pulses, mutually phase shifted are allocated to the connections provided for the control of the call switches for the connection of subscriber stations to a call multiplex bar to deliver from the subscriber stations selector information data in the form of multi-frequency code symbols. These multi-frequency code symbols are there transferred over a call multiplex bar to an apparatus for the reception of selector information data.

The invention now shows a way in which it is possible to carry out such transfer in an especially expedient manner whereby there are only a relatively few digit receivers required for the reception of the selector information data.

The invention relates, therefore, to an exchange system, especially for telephone purposes which operates according to the time multiplex principle, in which the individual subscriber stations are connected for the transmission of messages to a call multiplex bar over electronic call switches, which are controlled by mutually phase shifted control pulses which are assigned to connections effected thereby and in which for the reception of selector information data in the form of multi-frequency code symbols from the subscriber stations, digit receivers are connected over electronic switches associated therewith, during the pulse phases allocated to the subscriber station, to the call multiplex bar. This exchange system is characterized by the feature that the delivery of the multi-frequency code symbol representing a digit is in each case signaled by previous or simultaneous interruption of the subscriber loop and that such loop interruption effects the allocation of a digit receiver thereto for the reception of the digit in question, which receiver, after its reception, is again disconnected.

The assignment of a digit receiver, therefore, exists only for such a period of time as is needed for the reception of a digit. The assignment of a digit receiver is there effected by the interruption of the subscriber loop associated with the selection of the digit of a subscriber number. During the selection intervals the digit receivers are unconnected and stand available for the reception of digits which come from other subscribers. Also in the use of multi-frequency code symbols for the transmission of digits, the selection intervals have at least the same order of magnitude as the duration necessary for the digit reception. The time requirements on the digit receiver is therefore less than if it remained connected during the selection pauses. This means that fewer digit receivers are required than otherwise. If the assignment is carried out in the above-described manner, unlocking of digit receivers by subscribers who neglect to continue dialing is also automatically prevented. If it is further provided that in the delay of a multi-frequency code sign, a digit receiver is disconnected, whereby the blocking of digit receiver by continuous transmission of a multi-frequency code symbol by a subscriber is also prevented.

The various objects and features of the invention will appear from the description which will be rendered below with reference to the accompanying drawings.

As will be presently explained more in detail, the invention is concerned with a communication system operating according to the time multiplex principle, wherein the individual subscribers can be connected to a call multiplex terminal over electronic call switches controlled by mutually phase shifted control pulses which are respectively assigned to connections established by operations governed by these pulses. The characteristic features of this communication system reside in the provision of electronic switches indicated in FIG. 1 at *z*1 . . . *zi*, which are respectively assigned to digit receivers Z1 . . . Z*i* provided for receiving selection information supplied from the subscriber stations in the form of multi-frequency code symbols, so as to effect connection of the digit receivers with the call multiplex terminal SM, the electronic switches *z*1 . . . *zi* being operatively controlled by means of a special cyclic storer U*c* which is effective for periodically delivering, with the pulse sequence frequency of the control pulses, number or digit receiver addresses entered thereinto, such addresses being for the evaluation thereof conducted to a decoder D*c* cooperating with the cyclic storer U*c*, to which are connected the electronic switches *z*1 . . . *zi* assigned to the respective digit receivers Z1 . . . Z*i*, the switches thereby controlling the connections extending between the respective digit receivers and the call multiplex terminal SM.

Figure 1:
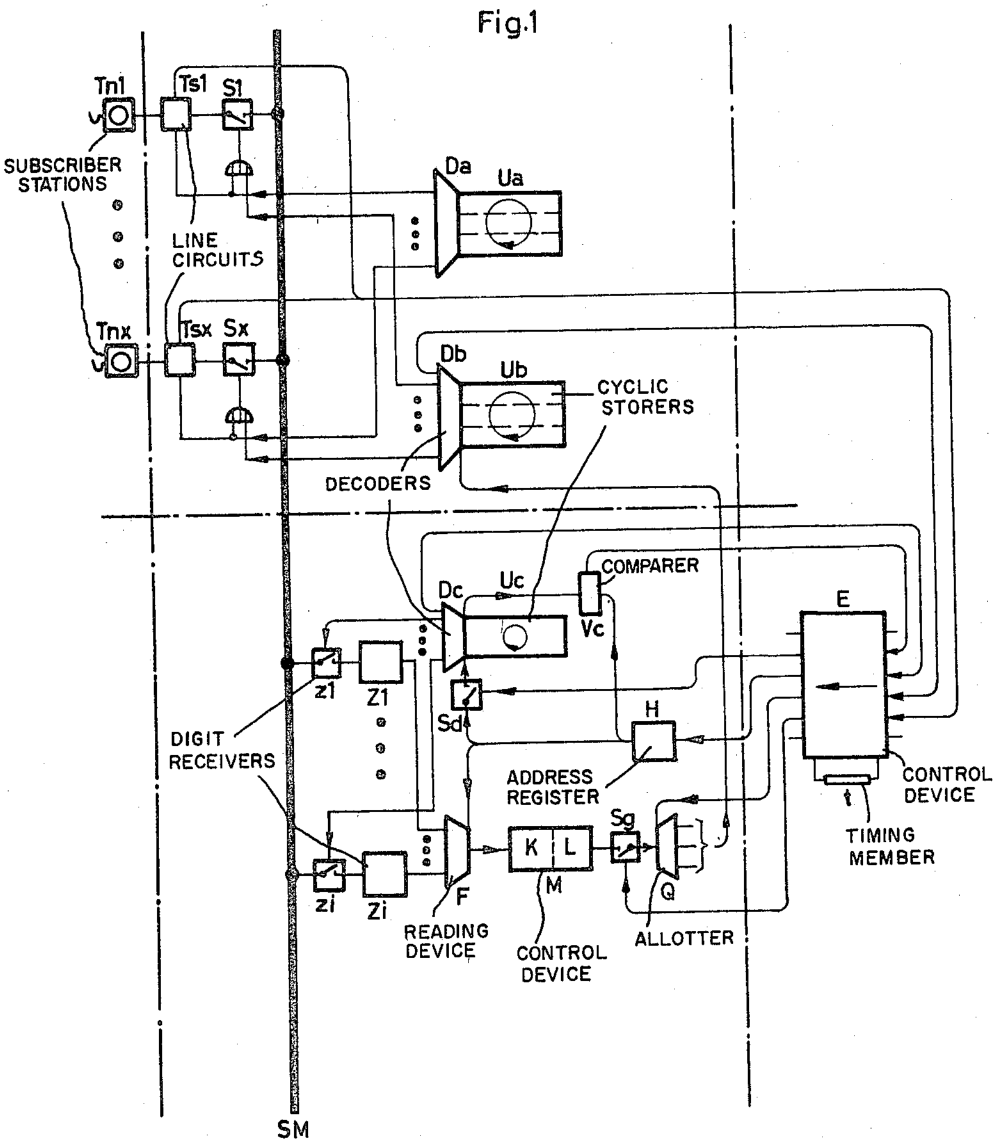
FIG. 1 shows in schematic manner a time multiplex telephone system comprising devices which are in functional cooperation with the circuit arrangement according to the invention.

The communication system illustrated in FIG. 1 serves subscriber stations T*n*1 . . . T*nx* which are respectively controlled over call switches S1 . . . S*x* connectible with the call multiplex terminal SM. The devices which deliver the control pulse include among others the cyclic storer U*b* and the decoder D*b* which is cooperatively connected therewith. The cyclic storer U*b* is assigned to subscriber stations engaged in incoming calls. In this storer are cycled addresses of the subscriber stations, such addresses appearing periodically at the outputs thereof which are connected to the decoder D*b*, the latter having as many outputs as there are subscribers. Accordingly, each output is assigned to a predetermined subscriber. When an address of a subscriber is conducted to the decoder, an impulse will be given off at the output thereof which is assigned to the respective subscriber, and such impulse is employed for the operative control of the call switch which is assigned to such subscriber. Each address which is being cycled in the cyclic storer U*b* has a given cycling phase. These cycling phases correspond to the pulse phases of the control pulses. Some cycling phases for use with further addresses are usually available. The writing in (entry) of addresses, for example, in the form of binary code symbols, requires several writing operations, so that incomplete addresses are at times cycled with given cycling phases.

The decoder D*b* also has a special output at which appears at instants corresponding to available phases, a signal indicating the availability of these phases. Special signals are likewise delivered at the auxiliary output, which are caused by incomplete addresses, and which also indicate in detail to what extent an address has already been entered. All these signals are conducted to a central control device E for further evaluation therein. The use of signals obtained from this special decoder output will be presently explained more in detail.

In addition to the cyclic storer U*b*, there is also provided a cyclic storer U*a* cooperating with a decoder D*a*. The cycling storer U*a* contains addresses of subscriber stations involved in outgoing calls, as well as addresses of subscriber stations at which calls had just been initiated.

There are in addition provided other devices belonging to the communication system, which have no direct bearing on the invention and therefore have been omitted in FIG. 1.

Figure 6:
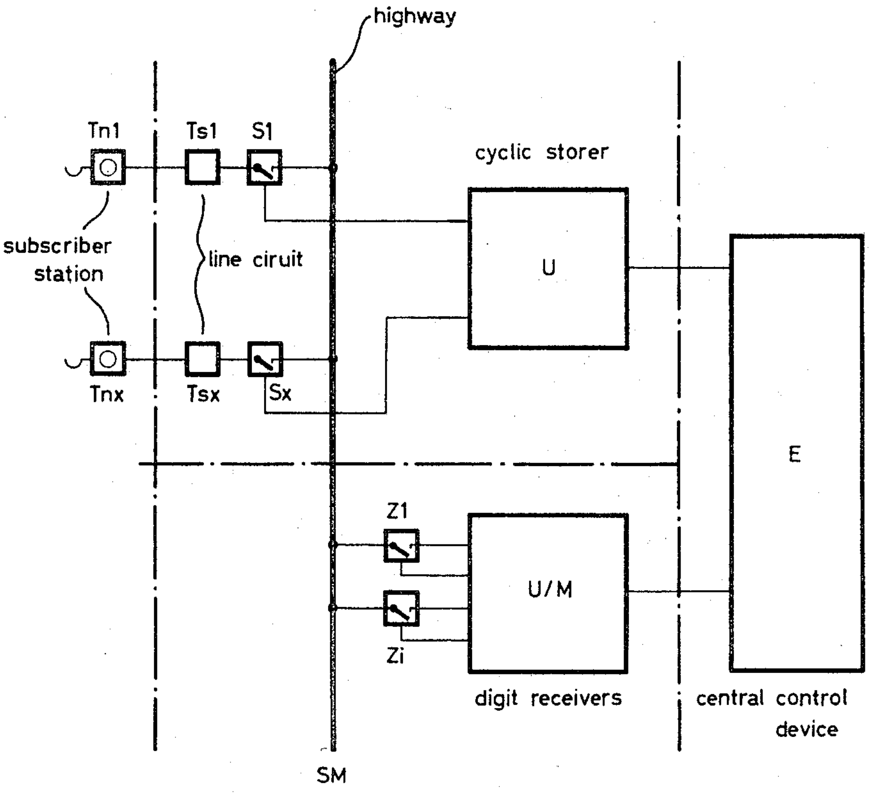
FIG. 6 is a diagram illustrating in block form the relation of the main components of the present system.

FIG. 6 illustrates, in block form, the general arrangement of the cyclic storer, the digit receivers and the central control device as well as the connections of the subscriber stations therewith.

Devices will now be described which in the illustrated system directly concern the invention. These are the number or digit receivers Z1 . . . Z*i* which can be connected to the call multiplex terminal SM over electronic switches *z*1 . . . *zi* respectively assigned thereto. As has been assumed, control pulses with given phase positions are assigned to the individual connections (calls). The respective call switches involved in a connection are switched through or closed during the appearance of the pulses of a control pulse assigned to the corresponding connection. If the called subscriber station is not yet determined, the call switch belonging to the calling subscriber station is nevetheless switched through. In accordance with the invention, the electronic switch belonging to a digit receiver is closed during the pulse phase assigned to the corresponding calling subscriber station, so that such digit receiver is at the same time connected to the call multiplex terminal SM. Accordingly, the selection information to be transmitted from the calling station can be received by the digit receiver so as to determine the desired called station. Other already previously established connections are not disturbed by such transmission of the selection information because the pulse phase exclusively reserved for the connection to be extended is used therefor. The selection information is transmitted in the form of multi-frequency code symbols, thus ensuring that it can be without difficulties extended to the call multiplex terminal SM. It must be considered in this connection that the multi-frequency code symbols are transmitted exactly as the speech currents are transmitted over an established connection. Difficulties in the transmission could however arise from the use of direct current code symbols.

The measures applied by the invention, which make it possible to effect the receipt of the selection information as explained above, avoid from the outset numerous difficulties arising in other comparable systems.

The individual digits of the desired subscriber number are transmitted by multi-frequency code symbols respectively assigned thereto. The digit receivers are here advantageously utilized to effect a conversion of the received multi-frequency code symbols into direct current code symbols, the latter respectively designating predetermined lines extending from the digit receiver. So long as a given multi-frequency code symbol is present at the involved digit receiver, the corresponding designation will also be on the lines extending therefrom. These lines can then be read impulse-wise with the use of very short pulses. The digit receivers need not have any storage capacity and therefore can be constructed very simply. More complicated operations, such as the control of the electronic switches *z*1 . . . *zi* are assigned to central devices which are provided for common use. However, there must be available a plurality of digit receivers corresponding in number to the maximum number of simultaneous calls to be expected.

Among the central devices for the control of the electronic switches *z*1 . . . *zi* is the cyclic storer U*c* at the outputs of which are periodically delivered adresses of digit receivers that had been entered (written) thereinto, the delivery of such addresses taking place with the pulse sequence frequency of the control pulses for the control of the call switches S1 . . . S*x*, the addresses of digit receivers being written in the cyclic storer U*c* so that they are always delivered in phase with those control pulses which are assigned to the respective subscribed station from which the selection information is to be received. The addresses delivered by the cyclic storer U*c* are evaluated by the decoder D*c* which is also operative responsive to receipt of an address from the cyclic storer U*c* to effect operative actuation of the respective electronic switch *z*1 . . . *zi* which is assigned to the involved digit receiver such as Z1 . . . Z*i*. The decoder D*c* corresponds structurally substantially to the previously mentioned decoder D$b$. It has an many outputs as there are digit receivers and these outputs are connected with the respective electronic switches $z1 \ldots zi$. The electronic switches $z1 \ldots zi$ are thus operatively controlled with the aid of the cyclic storer U$c$ and the decoder D$c$.

The decoder D$c$ also has an auxiliary output at which is delivered a special signal when a cycling phase is available in place of a written digit receiver address, that is, when there is no address at the outputs of the cyclic storer U$c$. This auxiliary output is likewise connected with the control device E.

The entering of addresses in the cyclic storer U$c$ is effected with the aid of an address register H which contains, arranged in predetermined order or sequence, the addresses of the various digit receivers. The address register H may be constructed, for example, with the aid of a counting chain which is stepped along in predetermined intervals. The respectively prevailing operating conditions of this counting chain represent binary numbers which are used as addresses. Whenever the counting chain reaches its end position, it is reset to again assume its start position.

Whenever a digit receiver is required responsive to the initiation of a call at a subscriber station, there will be in the address register H some address of which it is not yet known whether or not it belongs to an idle digit receiver. The corresponding address standing in the address register is therefore first compared with addresses already enetered in the cyclic storer U$c$, and if it is found that it is not yet in the cyclic storer U$c$, it is entered thereinto (written in) in correct phase with respect to the phase position of the control pulse assigned to the respective subscriber station. However, if this address is already contained in the cyclic storer U$c$, it is not utilized but the next successive address standing in the address register H is tested as to the availability thereof until a usable address is found.

The manner in which the phase correct entry (writing-in) of a digit receiver address is effected shall now be briefly mentioned. As already noted, there is provided the cyclic storer U$a$ which contains the addresses of subscribers engaged in outgoing calls, which includes, of course, the address of the subscriber station at which a call had just been initiated and from which selection information is to be transmitted. The control pulse extended to the call switch of the corresponding subscriber station has a phase position such that it always appears at the output of the cyclic storer U$a$ incident to the appearance of the address of such subscriber station. The cycling period or time of the storer U$c$ corresponds to that of the storer U$a$. The phase correct entry of the address of a digit receiver assigned to a calling subscriber station thus results necessarily at the correct instant in operative actuation of an electronic switch such as $z1 \ldots zi$. The phase is ascertained by a control of the subscriber addresses at the outputs of the cyclic storer U$a$.

In order to carry out the address comparison at the cyclic storer U$c$, there is provided a comparer V$c$ to which are conducted the addresses standing in the address register H as well as the addresses already entered in the cyclic storer U$c$. The duration of the address comparison corresponds to the cycling period of the addresses. Upon ascertaining identity of addresses, the comparer V$c$ delivers an entry-inhibiting criterion. In the illustrated system, this criterion is conducted to the control device E which thereupon effects appropriate operative control of the address register H. Upon ascertaining that an address standing in the address register H is to be entered or written into the cyclic storer U$c$, a line extending from the address register H to the cyclic storer U$c$, over which an address can be transmitted, is at the correct instant temporarily switched through, such operation being effected by the switch S$d$ which is governed by the control device E.

The above described procedure concerning the entry of addresses of the digit receivers with the aid of an address register, has among others a particular advantage, namely, it makes it possible to use the periodically changing digit receiver addresses standing in the register H for the reading of the digit receivers with respect to digits of subscriber numbers recorded therein. The changing of the addresses is advantageously effected at a spacing which is at least twice that of the pulse sequence period of the control pulse.

These addresses are extended to a reading device F which is structurally similar to a decoder and which is operative to read in the form of a digit the selection information standing in the respective digit receiver and to conduct the result of such reading to a central control device M.

The digit thus obtained is thereupon transmitted to the cyclic storer U$b$ which serves for the entry of addresses of subscriber stations engaged in incoming calls, that is, of called stations. This will be clear upon considering that the subscriber number dialed from a calling station is the number of a subscriber to be involved in an incoming call. The entry or writing-in must however proceed in very particular manner, that is, the corresponding called subscriber number must be entered with the cycling phase belonging to the calling subscriber station. The subscriber number or address which is to be entered must subsequently be periodically conducted to the decoder D$b$, in time intervals which coincide with the pulses of the control pulse assigned to the calling subscriber. In order to ascertain this cycling phase, the address of the digit receiver standing in the address register H is during the reading of a digit receiver always compared with the addresses entered in the cyclic storer U$c$. This can again be done with the aid of the comparer V$c$. The instant of address coincidence furnishes the phase position of the control pulse of the calling subscriber station from which had been transmitted the selection information received by the digit receiver. It must be considered in this connection that the address of the digit receiver assigned to the calling station had previously been entered with this phase position in the cyclic storer U$c$. The ascertained phase position is signalled to the control device E which thereupon controls the entry in the cyclic storer U$b$ of the digits recorded with the aid of the respective digit receiver and over the control device M, the corresponding operation involving actuation of the electronic switch S$g$ in such a manner that the number which is just present in the control device M is in the correct instant conducted to the cyclic storer U$b$. The ascertained number is therefore entered in the cyclic storer U$b$ in accordance with the ascertained phase position.

As described so far, to the digit receiver are conducted multi-frequency code symbols representing digits of a called subscriber station, and various digits are successively received and successively entered in the cyclic storer U$b$. Calling subscribers frequently interpose pauses in the dialing of the individual digit of a called number, and the chance is therefore present that digits are successively to be entered which come from different subscribers. As already explained, the phase position of the respective control pulse is always ascertained, requiring always a cycling of the addresses in the cyclic storer U$c$. This accounts for the procedure according to which an address is changed in the address register H only after the lapse of an interval which is at least twice as long as the pulse sequence period of the control pulses. The pulse sequence period of the control pulses is equal to the cycling time or period of the addresses in the cyclic storers U$c$ and U$b$.

In addition to the above described matters to be observed in connection with the entry of a digit in the cyclic storer U$b$, it must also be considered that the corresponding digit must be entered not only in correct phase but also at the correct place. A subscriber number or address consists as a rule of several digits, each of which is to be entered in the cyclic storer U*b* at a place corresponding to its place in the subscriber number. In order to accomplish this there is provided the place allotter Q. There is first obtained information whether any and if so, how many digits had been entered in the cyclic storer U*b* with the cycling phase belonging to the control pulse which is assigned to the number present in the control device M. The result of the corresponding reading is over the previously mentioned special output of the cycling storer U*b* extended to the control device E which now causes operative actuation of the place allotter Q so as to effect proper entry of the respective digit at the correct place, that is, at the next as yet vacant place. As indicated in FIG. 1, the place allotter Q is for this purpose provided with a plurality of output lines which are respectively assigned to predetermined places. The digit to be conducted to the cyclic storer U*b* is then extended over the appropriate line provided therefor.

The objects and functions of the control device M will be described next. The first object of this control device is to check the received direct current code symbol which represents a digit and to convert it into a form which is particularly well suited for the entry in the cyclic storer U*b*. The checking is done in the part K of the device M. The multi-frequency code symbol received by a digit receiver and representing a digit always has a given number of frequencies constituting symbol elements. A corresponding number of lines extending from the involved digit receiver are then marked, each by a given direct voltage. This constitutes the previously noted conversion of the multi-frequency code symbol into a direct voltage code symbol. The control effected in the part K of the control device M ascertains whether or not the received symbol has the proper and required symbol elements. Only when this is the case will the symbol be extended to the control part L. In the part L is effected a recoding of the symbol, for example in accordance with a binary symbol. This allows a reduction in the number of elements used for the symbols. A cyclic storer with reduced storage capacity is then required for storing these symbols. The binary symbols available in a tetrad binary code suffice for representing the decadic digits forming respectively the subscriber numbers and addresses. Each of these symbols has four symbol elements. The symbols OOOO and LLLL should not be used for representing digits. It will then be possible to also effect with relatively little expenditure a control of the symbols entered in the cyclic storer U*b*. Each symbol entered there, to be correct, must then contain at least one O and one L. Symbols in which this is not the case are error symbols and can be recognized with this criterion and eliminated. Suitable selection of the code symbols to be used will permit carrying out further controls in known manner.

After all digits belonging respectively to a called subscriber number or address are entered (written) in the cyclic storer U*b*, it will be among others necessary, for the idle-busy test, to ascertain whether or not the corresponding address (of the called subscriber) is already contained in the cyclic storer. If this is not the case, it is clear that the corresponding subscriber station is being called only from one calling subscriber station and that it can be connected therewith provided that it is not already involved in an outgoing call. The connection is effected by conducting to the call switch of the concerned called subscriber station the control pulse which is assigned to the calling station from which the address had been delivered. The call switches belonging to the two subscribers are thereby simultaneously operatively actuated.

In the event that the entered address stands already in the cyclic storer U*b*, the desired connection cannot be extended, or at least not readily extended, in the described manner. If the concerned called subscriber has already removed the receiver, this means that he either is already engaged in a call or that he intends to initiate a call. The address entered last in the cyclic storer U*b* must be deleted in such a case. If the last entered address stands in the cyclic storer U*b* with one or more cycling phases and the concerned subscriber has not yet removed the receiver, this means that he is wanted by several calling subscribers. However, he can be connected only with that one of the calling subscribers who has supplied his address. The other subscribers will receive the busy tone. The cycling phase assigned to them will in all cyclic storers be deleted when they replace the receiver.

As stated before, symbols comprising several frequencies, that is, multi-frequency code symbols are used for the transmission of the selection information. Special protective measures are advantageously applied in order to reliably prevent simulation of such a multi-frequency code symbol by sounds impinging on the microphone of the calling party, which might result in erroneous reception or storage of digits. Means may be provided for this purpose for signalling the delivery of a symbol representing a digit by preceding or simultaneous interruption of the subscriber loop circuit. This is made possible since the subscriber loop is closed responsive to the removal of the receiver before the concerned subscriber actuates the dial. The selection (dialing) of a digit is advantageously signalled by a interruption of the loop circuit during the dialing, which results in disconnection of the microphone. Such a loop interruption will not simulate replacement of the receiver by the subscriber due to the fact that a multi-frequency code symbol is at the same time received. The removal of the receiver at a subscriber station (initiation of a call) is a signalled over a particular line to the control device E. The subscriber line circuits T*s*1 . . . T*sx* are for this purpose connected with the control circuit E. It may also be mentioned that the interruption of the subscriber loop circuit does not operate in a manner as would result from the replacement of the receiver to signal the completion of a call, because a multi-frequency code symbol is at the same time or briefly thereafter delivered from the subscriber station, which prevents deletion of the address of the respective subscriber, which is being cycled in the cyclic storer U*a*, as an address involved in an outgoing call.

The interruption of the subscriber loop is also utilized for the operative connection of the respective digit receiver. A digit receiver is connected to the multiplex terminal SM only when the loop of the subscriber to which it is assigned is interrupted at the corresponding subscriber station. The received digits or the symbols corresponding thereto stand at the digit receiver for a given time interval within which they can be repeatedly read by the reading device F. It must now be prevented that these symbols are repeately entered in the cyclic storer U*b*, which would result in wrong addresses. This is accomplished by utilizing the pause occurring always between two successive multi-frequency code symbols. The appearance of this pause is recognized in the reading and is signalled to the control device. E. Only one digit is entered in the cyclic storer U*b* after each pause. Accordingly, even if the identical digit recurs in the reading of a digit receiver, such digit will be entered only once.

The release of a digit receiver after a predetermined time interval following transmission of a multi-frequency code symbol, also prevents blocking thereof by the transmission of a prolonged multi-frequency code symbol from the calling station.

The functions and operations described in the foregoing are respectively effected responsive to control commands delivered by the control device E. Signals are for this purpose delivered from the various devices of the system to the control device E. The corresponding control commands are thereupon obtained with the aid of a linking circuit contained in the control device. The linking circuit may be constructed, for example, by means of And- and Or-gates as well as flip-flop circuits serving as storers. The control commands are then conducted to the concerned devices during the address cycling and if required, in the appropriate cycling phase. The control device E is therefore connected with all these devices. In order to permit in the delivery of the control commands consideration of the appropriate cycling phase, there are provided timing members in the control device E, which are started, for example, at the instant when address coincidence is ascertained, and which effect after the lapse of the interval required for the cycling of the addresses, delivery of the respective control command. Such a timing member is indicated in FIG. 1 at *t*.

The various devices so far described in connection with the communication system shown in FIG. 1 can be constructed in known manner. This also applies to the cyclic storers, since communication systems are known which utilize such storers. The device used as decoders are likewise known. The address register H can be constructed with the aid of counting chains. The comparer V*c* may be constructed with the aid of gates. There are also known electronic switches which are in the illustrated system used as call switches and for other purposes, and, as noted before, the system is also provided with other devices which have been omitted in FIG. 1 since they have no direct bearing on the invention.

Structural examples of devices used in the communication system will now be described more in detail with reference to FIGS. 2 to 5.

Figure 2:
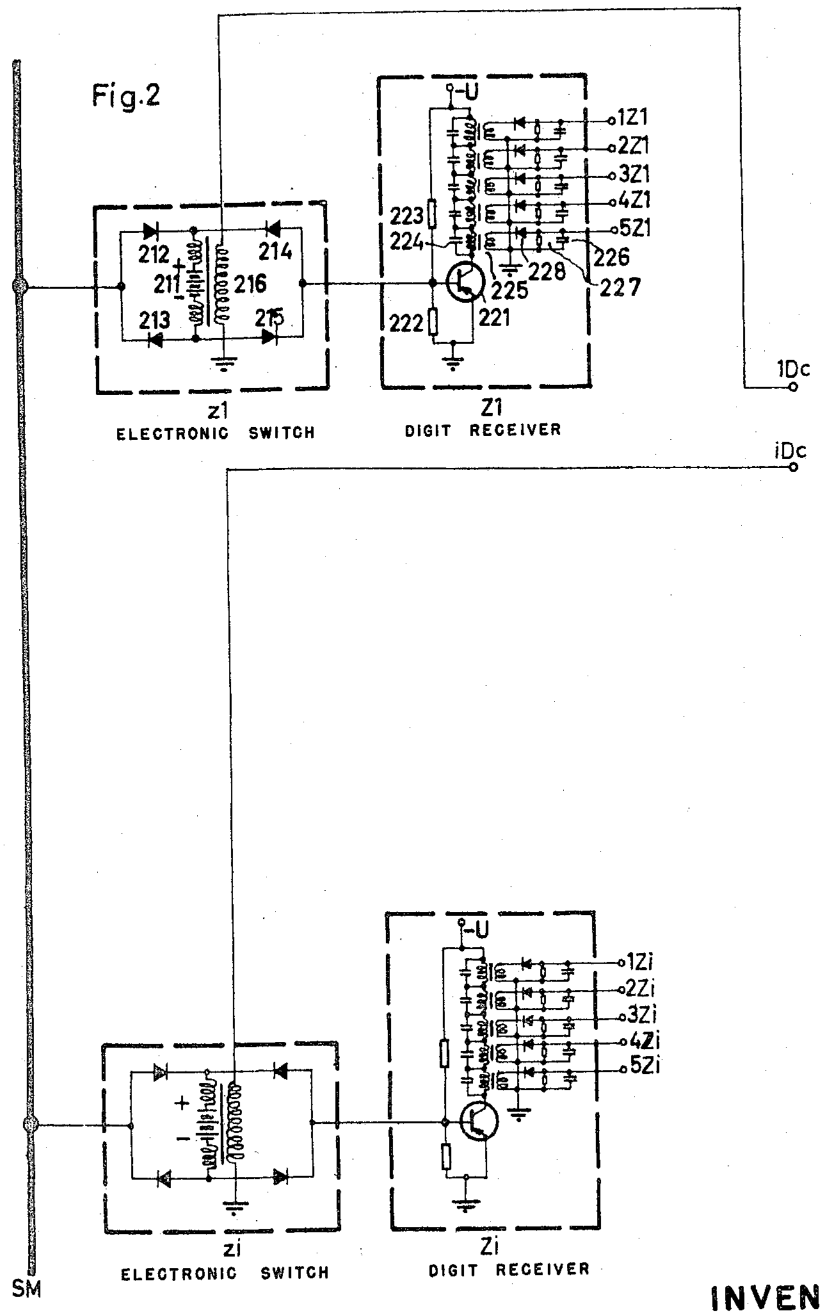
FIGS. 2 to 5 show structural examples of these devices.

Digit receivers and electronic switches represented in FIG. 2 will be considered first. To the digit receiver Z1 belongs the electronic switch *z*1 which is controlled by the decoder D*c* (FIG. 5) by negative impulses over the terminal 1D*c*. The electronic switch *z*1 comprises rectifiers 212 . . . 215 and the transformer 216. The rectifiers are in normal condition operative in blocking direction, by the voltage of the source 211 which is connected in series with the secondary windings of the transformer 216. Accordingly, in this condition of the switch *z*1, no signals from the call multiplex terminal SM can reach the digit receiver Z1. The negative impulses delivered by the decoder D*c* (FIG. 5) are conducted to the primary winding of the transformer 216 and produce impulses in the secondary windings thereof. Assuming that the transformer windings extend in appropiate sense, the impulses appearing in the secondary windings will have a polarity such that the rectifiers will become conductive. The presence of such impulses will therefore be operative to effect transmission of signals, which are on the multiplex terminal SM, to the digit receiver Z1.

The signals reaching the digit receiver Z1 are conducted to the transistor 221 which serves as a amplifier. These signals are, as mentioned before, multi-frequency code symbols. To the collector of the transistor 221 are connected a plurality of oscillator circuits which are respectively tuned to the frequencies representing the multi-frequency code symbols. One of the oscillator circuits comprises the transformer 225 and the capacitor 224. To this oscillator circuit is coupled the rectifier circuit comprising the rectifier 228, the capacitor 226 and the resistor 227. The transistor 221 amplifies the multi-frequency code symbols conducted thereto. Upon appearance of a multi-frequency code symbol having the frequency to which the oscillator circuit comprising the capacitor 224 and the transformer 225 is tuned, there will in known manner appear a voltage on the capacitor 226 which signals this condition. One terminal of the capacitor 226 is on ground potential. The rectifier 228 is disposed in the circuit so that the other side of the capacitor 226, to which is also connected the terminal 5Z1, becomes upon appearance of this voltage, negative with respect to ground. The capacitor 226 can discharge again over the resistor 227. Negative potentials appear in given situations in corresponding manner at the capacitors belonging to the other oscillation circuits to which are respectively connected the terminals 1Z1 . . . 4Z1. When multi-frequency code symbols are used which are constructed in accordance with the 2–5 code, negative potentials will respectively appear at two of the terminals 1Z1 . . . 5Z1. It may also be mentioned that the base of the transistor 221 is over the resistors 222 and 223 on a potential such that the transistor can operate as an amplifier. The terminal of the resistor 222 which faces away from the transistor base is on ground potential and the terminal of the resistor 223 which faces away from the transistor base is on the potential —U.

Figure 3:
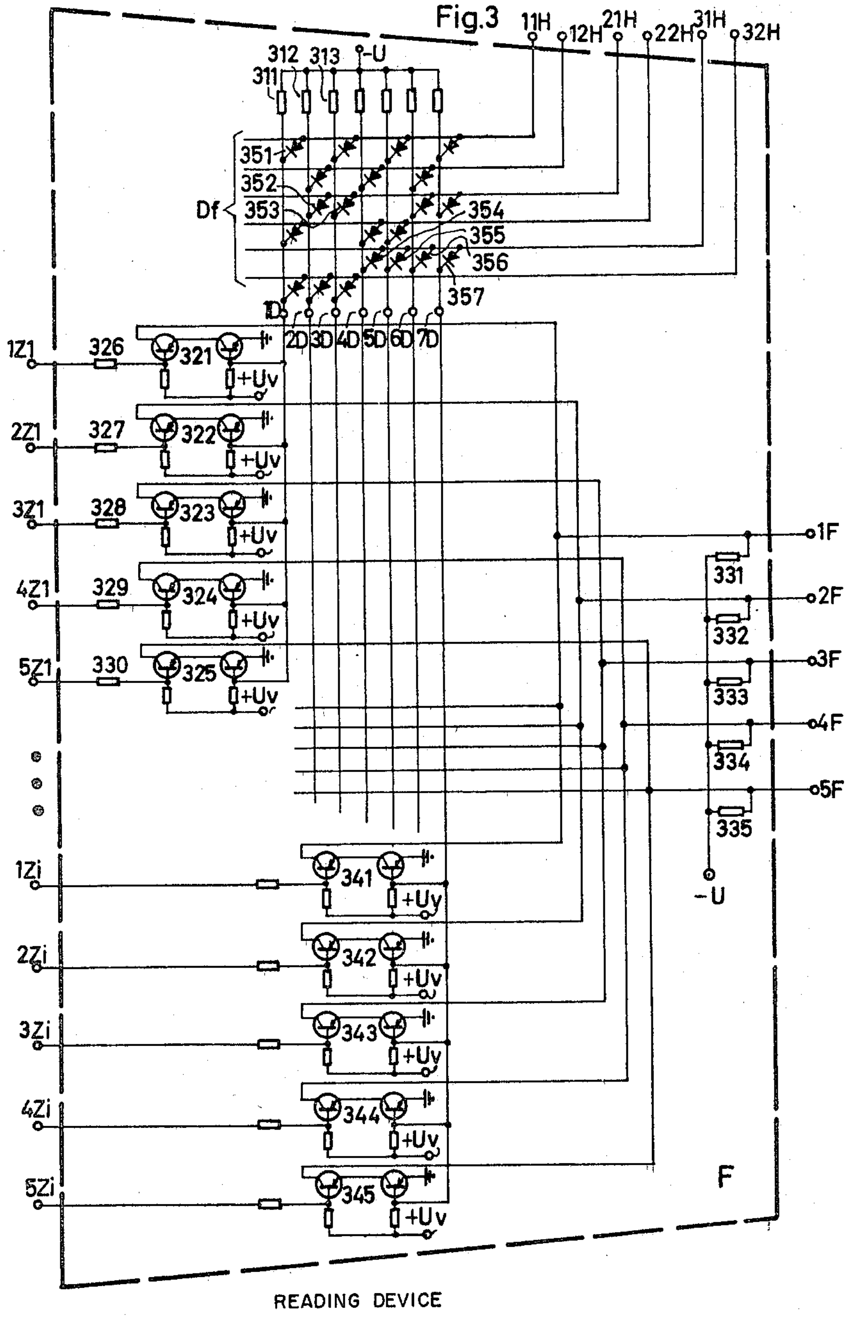

FIG. 3 shows an example of an embodiment of the reading device F of FIG. 1. The illustrated reading device is adapted for the reading of seven digit receivers and is controlled over the input terminal pairs 11H–12H, 21H–22H, 31H–32H, over which the addresses of the digit receivers are extended in the form of binary code symbols. Each binary code symbol consists of three symbol elements, one of which is always conducted to one of the input terminal pairs. A symbol element can be represented either by the presence of ground potential on one terminal of the respective terminal pair and negative potential on the other respective terminal, or by these polarities appearing exchanged on the two terminals. In the normal condition, there will be ground potential on the input terminals 11H, 21H and 31H and negative potential will be on the terminals 12H, 22H and 32H. This potential distribution corresponds to the binary code symbol OOO. If these potentials are exchanged at the three input terminals, the resulting condition will correspond to the binary code symbol LLL, etc.

To the input terminal pairs is connected the device D*f* forming part of the reading device F, the device D*f* having seven terminals 1D . . . 7D. Depending upon which of the binary code symbols is conducted to the input terminal pairs, one of the terminals 1D . . . 7D will be marked by negative potential —U appearing thereon. Only when the binary code symbol OOO is supplied will none of the terminals 1D . . . 7D be marked.

The device D*f* is constructed of a matrix with rectifiers. The potential —U is connected to the column lines (vertical lines) of the matrix over the resistors 311, 312, 313, etc. The row lines (horizontal lines) of the matrix are joined pairwise and assigned to the respective input terminal pairs. Thus, the first row line pair is connected with the terminal pair 11H–12H; the second row line pair is connected with the input terminal pair 21H–22H; and the third row line pair is connected with the input terminal pair 31H–32H. As already mentioned, there is in normal condition ground on the terminals 11H, 21H, 31H and negative potential on the terminals 12H, 22H, 32H. The column lines of the matrix are connected to the seven terminals 1D . . . 7D. The rectifiers bridge the crossing points of the row lines and the column lines and are thereby so distributed and polarized, that negative potential will appear on one of the terminals 1D . . . 7D (on which there is normally ground potential) when the potentials on at least one input terminal pair are exchanged. The potentials on at least one input terminal pair are exchanged when binary code symbols are conducted to the pairs of input terminals. Accordingly, negative potential will appear at one of the terminals 1D . . . 7D. There are a total of seven different binary code symbols to be considered. The device D*f* operates as a decoder since one of the terminals 1D . . . 7D will always be marked in accordance with the binary code symbol which is being supplied.

As already explained, there is in normal condition ground potential on the terminals 11H, 21H and 31H. This ground potential is in normal condition also effective at the terminals 1D . . . 7D. It must be considered in this connection that the ground potential is extended from the terminal 11H to the terminal 1D over the rectifier 351, while being extended from the terminal 21H to the terminal 2D over rectifier 352, and from the terminal 31H to the terminal 3D over rectifier 353. The ground potential is moreover extended from the terminal 31H over the rectifiers 354, 355, 356 and 357 to the terminals 4D, 5D, 6D and 7D. When the potentials are now interchanged, for example, at the terminal pairs 11H, 21H, the ground potential cannot as before reach the terminal 1D over the rectifier 351. The negative potential —U will instead be effective at the terminal 1D over the resistor 311, the ground potential being maintained at the terminals 2D . . . 7D since it is conducted thereto from the terminals 21H and 31H as before. Negative potential will appear at one of the terminals 2D . . . 7D in similar manner when one of the other binary code symbol is supplied.

The negative potential appearing at the terminals 1D . . . 7D is used in the reading device F for operatively controlling electromagnetic switching devices. There are provided seven such switching devices, only one such switching device, namely, the first one which is connected to the terminal 1D, being shown in FIG. 3. This first switching device comprises the pairs of transistors 321 . . . 325. In each transistor pair, the emitter-collector paths of the two transistors are connected in series, one of the emitters of the respective transistors being connected to ground potential. The bases of these transistors are over resistors connected to the potential +U*v*, so that these transistors are normally in blocking condition. The base of one transistor of each pair is connected to the terminal 1D. When there is negative potential on this terminal, the transistors connected therewith will be made conductive. To the bases of the other transistors of the transistor pairs are connected the input terminals 1Z1 . . . 5Z1 over resistors 326 . . . 330.

These terminals are connected with the similarly designated terminals of the digit receiver Z1 (FIG. 2). When a multi-frequency code symbol is conducted to this digit receiver and given ones of its output terminal 1Z1 . . . 5Z1 are as a consequence marked by negative potential, the transistors of the electronic switching arrangement which is being considered and which is connected with these terminals, will become conductive. The emitter of one transistor of each transistor pair lies on ground potential. When both transistors of a pair are conductive, the collector of the other transistor of this pair will be placed on ground over the emitter-collector paths of the two transistors. The collector of the transistor pair 321 is connected to the output terminal 1F. So long as the two transistors of this pair are in blocking condition, the potential —U will be over resistor 331 operative at the terminal 1F. However, when both transistors of the transistor pair 321 are conductive, there will be ground potential on the terminal 1F. The transistor pairs 322 . . . 325 are respectively connected with the terminals 2F . . . 5F in the same manner as the transistor pair 321 is connected with the terminal 1F. These terminals 2F . . . 5F are likewise connected with the negative potential —U over the resistors 322 . . . 335, this potential being operative at the respective terminals up to the instant when the transistor pairs respectively associated therewith are made conductive.

As already mentioned, the addresses of digit receivers are conducted to the reading device F over the pairs of terminals 11H–12H, 21H–22H and 31H–32H. There is in such case negative potential on one of the terminals 1D . . . 7D. One transistor of each of the pairs of transistors respectively connected with these terminals is thereby made conductive. Thus, when negative potential is on the terminal 1D, one transistor of each transistor pair 321–325 will be conductive. Further transistors of these transistor pairs will become conductive upon receipt of a multi-frequency code symbol by the digit receiver Z1 (FIG. 2) since signals will be transmitted therefrom over the respective lines 1Z1–5Z1 to the reading device F (FIG. 3). Thus, assuming that signals are extended over lines 1Z1 and 2Z1, both transistors of the transistor pairs 321 and 322 will be conductive. The negative potential at the output terminals 1F and 2F will accordingly disappear and ground potential will appear thereon. The symbol received by the digit receiver Z1 will thus be extended to the respective terminals 1F . . . 5F, such signal disappearing again upon disappearance of the negative potential at the terminal 1D. Another digit receiver can now be read. For example, when negative potential is at the terminal 7D, the digit receiver *Zi* will be read with the aid of the transistor pairs 341 . . . 345.

Figure 4:
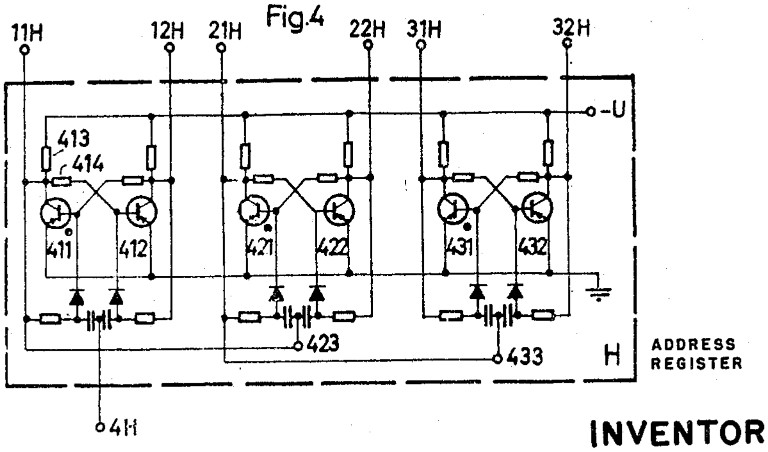

The addresses of the digit receivers are supplied by the address register H (FIG. 1), a circuit example of which is represented in FIG. 4. The illustrated address register comprises three bistable flip circuits each having two transistors. Thus, the first flip circuit comprises the transistors 411–412, the second flip circuit the transistors 421–422, and the third flip circuit the transistors 431–432. These flip circuits are constructed in known manner. Each can assume two operating conditions wherein one or the other transistor is conductive. The collectors of these transistors are connected with the respective terminal pairs 11H–12H, 21H–22H and 31H–32H (see also FIG. 3) at which are delivered the digit receiver addresses. The three flip circuits are circuited to form a binary counting chain. The terminal 4H constitutes the count input which is over rectifier gates connected with the bases of the transistors 411 and 412. The transistors 411, 421 and 431 are in normal or resting condition of the address register, conductive. Ground potential will then be on the terminals 11H, 21H and 31H, since the respective transistors are on ground potential over the collector-emitter paths thereof. Negative potential is at the same time at the terminals 12H, 22H and 32H, since the transistors to the collectors of which they are connected, are blocked, so that the potential —U can over the collector resistors become effective at these terminals.

When a positive impulse is supplied to the count input 4H, such impulse will be extended to the base of the transistor 411, thereby blocking it. The transistor 412 becomes at the same time in known manner conductive, since the collector potential of the transistor 411 becomes more negative when such transistor is in blocking condition, which affects the base of the transistor 412 over the resistor 411. Negative potential will then be on the terminal 11H, since the negative potential —U can become operative thereat over the collector resistor 413. Since the transistor 412 is now conductive, ground potential will be on the terminal 12H. Accordingly, the potentials on the pair of terminals 11H–12H have been interchanged as compared with the previously prevailing condition.

When a further positive impulse is conducted to the count input 4H, the transistor 412 will be blocked, whereby the transistor 411 is made conductive again. Its collector potential will thereby become more positive, since there is again ground potential thereon. The collector of the transistor 411 is now connected with the terminal 423 of the second bistable flip circuit comprising the transistors 421, 422. When the transistor 411 becomes conductive, a positive potential surge is extended to the terminal 423. Accordingly, the transistor 421 will become blocked in similar manner as the transistor 411 had been blocked before. The second flip circuit of the counting chain representing the address register is in this manner controlled incident to the further counting operation thereof. The collector of the transistor 421 is connected with the terminal 433 of the third flip circuit comprising the transistors 431, 432, and this latter flip circuit is accordingly in the further counting similarly operatively effective. It follows, therefore, that different three-place binary code symbols will in the course of the counting appear at the terminal pairs 11H–12H, 21H–22H and 31H–32H. These terminal pairs are connected with the identically referenced terminal pairs of the reading device F (FIG. 3) to which the resulting binary code symbols are conducted.

Figure 5:
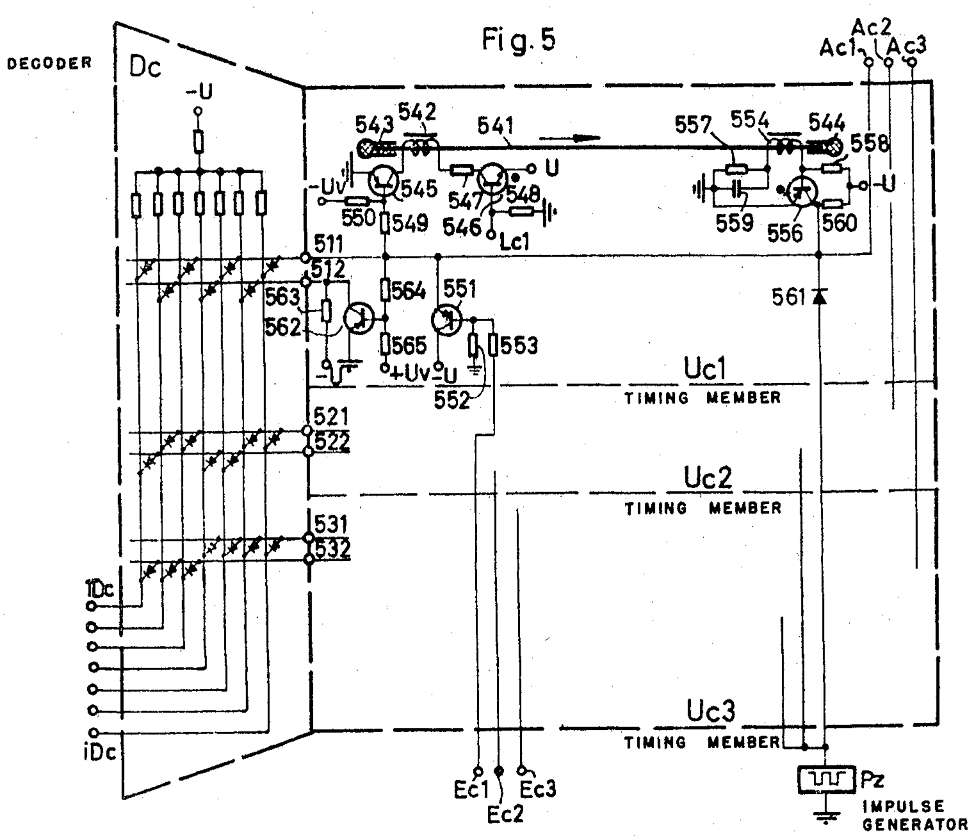

FIG. 5 shows a circuit example for the decoder D*c* and the cyclic storer U*c* cooperating therewith. The decoder D*c* is constructed exactly as the decoder D*f* explained in connection with the description of FIG. 3. Addresses of digit receivers are in the form of binary code symbols likewise conducted thereto, which is done over the pairs of terminals 511–512, 521–522, 531–532. One of the seven outlets 1D*c* . . . *i*D*c* (see also FIG. 2) is consequently marked by negative potential. This negative potential replaces temporarily the ground potential previously present at the respective output, and a negative impulse will in a given case appear at the respective terminal. The terminals 1D*c* . . . *i*D*c* are interconnected with the identically referenced terminals of the electronic switches *z*1 . . . *zi*, shown in FIG. 2, and these electronic switches are caused to become alternately conductive by the negative pulses delivered by the decoder D*c*.

To the decoder D*c* are delivered the digit receiver addresses from the cyclic storer U*c*. The latter contains three identically constructed timing elements or members U*c*1, U*c*2 and U*c*3 into which can be entered periodically cycled impulses. FIG. 5 shows one of these timing members in detail, namely, the timing member U*c*1. It comprises a delay wire 541 of a length, such that an impulse supplied magnetostrictive at one end reaches the other end thereof after the lapse of the time interval between two pulses of a control pulse. The wire is at its opposite ends held by suitable means 543, 544 so that no reflection of impulses can occur at such ends. Impulses can be supplied to the wire 541 by means of the coil 542. When a current impulse traverses this coil, there is produced a magnetic field which is effective to somewhat lengthen or to shorten the wire. This longitudinal alteration traverses the wire as an impulse extending in longitudinal direction. The wire consists of a ferromagnetic material, for example, nickel.

One end of the coil 542 is placed on ground potential over the collector-emitter path of the transistor 545 and the other end thereof is placed on the potential —U over the resistor 547 and the collector-emitter path of the transistor 546. The base of the transistor 546 is over the resistor 548 on ground potential and such transistor is therefore normally conductive. The base of the transistor 545 is over the resistor 550 on positive potential +U, and this transistor is therefore normally blocked. The base of this transistor is also connected with the terminal 511 over the resistor 549. When a negative impulse appears on this terminal, the transistor 545 will become temporarily conductive, thus causing a current pulse to flow through the coil 542, thereby inducing an impulse in the wire 541. The resistor 547 serves for limiting the current strength. Negative impulses can occur on the terminal 511 for two different reasons.

In the first place, such impulses can be produced with the aid of the transistor 551, the emitter of which is connected with the terminal 511, the collector being connected with the potential —U, while its base is connected to ground over the resistor 552. The transistor 551 is accordingly normally blocked. It will become temporarily conductive when a negative impulse is placed on the terminal E*c*1 which is extended to its base over the resistor 553, thereby producing an impulse which traverses the wire 541. Impulses can be conducted in similar manner to the timing members U*c*2 and U*c*3 over the terminals E*c*2 and E*c*3. The terminals E*c*1, E*c*2 and E*c*3 thus represent the inputs of the cyclic storer U*c*, over which addresses are supplied for cycling therein.

The second possibility for producing negative impulses on the terminal 511 involves the use of the coil 554 disposed at the right end of the wire 541. An impulse traversing the wire will induce an impulse in the coil 554 to which is connected the base of the transistor 556. The resistors 557 and 558 which are respectively on ground potential and on the potential —U, are connected serially with the coil 554, thus holding the base of the transistor 556 at a potential which is effective to make such transistor normally conductive. The coil 554 is wound in a sense such that it conducts in a given case a positive impulse to the base of the transistor 556 so that such transistor is temporarily blocked. The collector of this transistor is over the resistor 560 on the negative potential —U while the emitter hereof is on ground potential. The collector is also connected with the terminal 511. Accordingly, when the transistor 556 is conductive, as in its normal condition, there will be ground potential on the terminal 511. However, when this transistor is blocked, the negative potential —U will be over the resistor 560 effective with respect to the terminal 511. This will be the case when an impulse which had been placed on the wire 541 passes the coil 554. This impulse is by the cooperation of the transistors 556 and 545 again placed on the wire 541, thus traversing the wire periodically.

An address which is being cycled in the cyclic storer may also comprise more than one impulse, each impulse cycling periodically in a different timing member. These impulses are placed in the timing members with the same cycling phase and the cycling thereof always with the same phase must now be secured. There is for this purpose provided a synchronizing device, comprising the impulse generator P*z* which is over rectifiers connected with the respective terminals 511, 521 and 531 of the timing members U*c*1, U*c*2 and U*c*3. As shown in FIG. 5, the connection of the impulse generator P*z* with the terminal 511 of the timing member U*c*1, extends over the rectifier 561. The impulse generator delivers negative impulses which are spaced apart corresponding to the spacing of impulses which successively traverse the timing members. The internal impedance of the impulse generator P*z* is very low. The terminal 511 is therefore during the pauses between impulses on ground potential over the rectifier 561 and the internal impedance of the impulse generator P*z*. A negative impulse can appear on the terminal 511 only when the transistor 556 is blocked and when the impulse generator P*z* delivers at the same time a negative impulse. The negative potential —U on the resistor 560 cannot become operative on the terminal 511 merely responsive to blocking of the transistor 556 and in the absence of a negative impulse from the impulse generator P*z*, because the terminal 511 is in such case on ground potential over the rectifier 561 and the low internal impedance of the impulse generator. If there is present only the negative impulse from the impulse generator P*z*, the rectifier 561 will block its extension to the terminal 511.

The addresses which are being cycled in the cyclic storer U*c*, which are supplied to the decoder D*c*, can also be delivered to other devices, for example, to devices respectively connected with the output terminals A*c*1, A*c*2, A*c*3, shown in FIG. 5. The terminals 511, 521, 531 of the timing members U*c*1, U*c*2, U*c*3 are for this purpose respectively connected with the output terminals A*c*1, A*c*2, A*c*3, the interconnection being for the sake of simplicity only shown with respect to terminal 511 and output terminal A*c*1.

The addresses which are being cycled can also be deleted again. The timing members are for this purpose provided each with a transistor such as 546 shown in connection with the timing member U*c*1. This transistor is normally conductive and will be blocked when a sufficiently negative impulse is extended to the terminal L*c*1.

An impulse which is at this instant to be re-entered in the wire 541 is thereby suppressed and thus deleted. Impulses are in similar manner deleted in the timing members U*c*2 and U*c*3 of the cyclic storer U*c*.

The decoder D*c* (FIG. 5) is just like the decoder D*f* (FIG. 3) controlled over row conductor pairs lying on predetermined potentials which are at intervals interchanged. The timing member U*c*1 is connected with the terminal pair 511–512. The supply of potentials to the terminal 511 has already been described. The terminal 512 is normally over resistor 563 on the potential —U. Negative potential appearing on terminal 511 is over resistor 564 extended to the base of the normally blocked transistor 562, which is thus made conductive. The collector of this transistor is connected with the terminal 512 and the emitter thereof is on ground potential. Accordingly, ground potential is placed on the terminal 512 when the transistor 562 is made conductive. The terminal 512 therefore carries either negative potential or ground potential. The required potential interchange on the terminals 511 and 512 is in this manner effected whenever needed. The circuit comprising the transistor 562 operates accordingly as inverter. The terminals 522 and 532 of the timing members U*c*2 and U*c*3 are supplied with potentials in corresponding manner.

Changes may be made within the scope and spirit of the appended claims which define what is believed to be new and desired to have protected by Letters Patent.

We claim:

1. In a communication system operating in accordance with the time multiplex principle, the combination of individual subscriber stations, a call multiplex terminal, electronic call switches operatively connecting the respective subscriber stations with the call multiplex terminal, means operatively connected with said call switches for controlling the same by mutually phase shifted control pulses assigned to connections effected thereby, a plurality of digit receivers, electronic switches operatively connecting said digit receivers to the call multiplex terminal, means in said subscriber circuit for transmitting identifying selection information, in the form of digits, by multi-frequency code symbols, means in the subscriber loop circuit for interrupting the same to signal delivery of such a multi-frequency code symbol, and means connected to and operatively controlling said second-mentioned electronic switches, responsive to such loop circuit interruption, for effecting connection of a digit receiver to the call multiplex terminal during receipt of the digit involved, following which such digit receiver is operatively disconnected therefrom.

2. A communication system according to claim 1, wherein said digit receivers comprise a plurality of outgoing conductors, and means for converting the received multi-frequency code symbols into direct voltage code symbols which are utilized for marking predetermined outgoing conductors.

3. A communication system according to claim 1, comprising a control device for governing the operation of the devices involved in the extension and maintenance of connections, means for conducting to said control device control criteria from said devices involved, and a linking circuit in said control device for thereupon releasing appropriate control commands which are conducted to the respective devices.

4. A communication system according to claim 1, wherein said means for operatively controlling said second-mentioned electronic switches comprises a cyclic storer, outlet means for said storer for extending addresses entering therein periodically with the pulse sequence frequency of said control pulses, said addresses constituting addresses of digit receivers which are entered so as to be extended by the storer in phase with those control pulses which are assigned to subscriber stations from which selection information is to be received, and means forming a decoder for receiving said addresses from the cyclic storer, said decoder being operative to evaluate the respective addresses and to extend addresses to the respective last named electronic switches for the purpose of operatively actuating such switches to effect connection of the digit receivers respectively assigned thereto.

5. A communication system according to claim 4, comprising an address register operatively connected to and cooperable with said cyclic storer in the entry of addresses in the latter, said address register containing in succession the addresses of digit receivers, means effective upon demand of a digit receiver, responsive to initiation of a call at a subscriber station, for comparing an address contained in said address register with addresses already entered in said cyclic storer and upon ascertaining that such address had not yet been entered in said cyclic storer, for entering such address therein in correct phase with respect to the phase position of the control pulse assigned to the respective subscriber station, and means effective upon ascertaining presence of said address in said cyclic storer for discarding such address and testing in similar manner the next address contained in said address register as to the usability thereof until a usable address is found.

6. A communication system according to claim 5, comprising an address comparer, means operatively connecting the same to said address register for conducting said addresses thereto, and means in said comparer for delivering upon address similarity a comparison criterion which prevents the entry of the respective address.

7. A communication system according to claim 5, wherein the digit receiver addresses contained in said address register follow one another with a spacing which corresponds to at least twice the interval of one control pulse cycle, comprising a device opeartively connected to said digit receivers for reading the same, a central control device, means for conducting said digit receiver addresses to said reading device, means in said reading device for reading the respective digit receiver so as to ascertain selection information received thereby, and means for conducting ascertained selection information to said central control device.

8. A communication system according to claim 7, comprising another cyclic storer for cycling control pulses for called subscriber stations, means effective during the reading of a digit receiver for comparing the respective digit receiver address contained in the address register with the addresses entered in said first named cyclic storer to obtain the phase position of the control pulse of the calling subscriber station which had supplied the selection information received by the digit receiver, and means for entering said selection information in said other cyclic storer with the phase position of the control pulse of the calling subscriber station, said other cyclic storer supplying control pulses for governing the operation of the call switch of the called station.

9. A communication system according to claim 8, wherein the multi-frequency code symbol received by a digit receiver and corresponding to a digit, always contains a given number of frequencies as symbol elements, and means in said control device for checking the received code symbol for the purpose of code control with respect to the correct number of symbol elements and for extending such symbols only upon ascertaining the accuracy of the number of elements thereof.

10. A communication system according to claim 9, comprising means for converting the code symbol received by said control device, prior to the further extension thereof, according to a tetrad binary code with exclusion of the symbols 0000 and LLLL.

11. A communication system according to claim 8, wherein the respective digit receivers receive only the selection information corresponding to one digit of a called station.

12. A communication system according to claim 11, comprising means effective after the entry in said other cyclic storer of all digits belonging to a called subscriber station, for ascertaining for purposes of the idle-busy testing thereof whether the corresponding address is already contained in said cyclic storer.

13. A communication system according to claim 11, comprising a place allotter for assigning to the digit to be entered in said other cyclic storer for called subscriber stations, its place according to the place thereof which it occupies in the number of the respective subscriber station, and means in said place allotter for reading the digits entered in the corresponding cyclic storer for obtaining the information required for the corresponding place allotment.

References Cited by the Examiner

UNITED STATES PATENTS

| | | | |
|---|---|---|---|
| 2,917,583 | 12/1959 | Burton et al. | 179—15 |
| 2,953,749 | 9/1960 | Beesley | 179—18.9 |
| 2,984,705 | 5/1961 | Harris | 179—15 |
| 3,061,685 | 10/1962 | Peach | 179—15 |

DAVID G. REDINBAUGH, *Primary Examiner.*

THOMAS B. HABECKER, *Examiner.*

T. G. KEOUGH, R. L. GRIFFIN, *Assistant Examiners.*